(12) United States Patent
Geroult et al.

(10) Patent No.: US 7,357,071 B2
(45) Date of Patent: Apr. 15, 2008

(54) AUTOMATIC COFFEEMAKER

(75) Inventors: Marc Geroult, Oisseau-le-Petit (FR); Séverine Mih, Mamers (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 11/389,208

(22) Filed: Mar. 27, 2006

(65) Prior Publication Data

US 2006/0219102 A1    Oct. 5, 2006

(30) Foreign Application Priority Data

Mar. 31, 2005   (FR) .................................. 05 03124

(51) Int. Cl.
   *A47J 31/34*   (2006.01)
(52) U.S. Cl. ................. 99/285; 99/289 R; 99/295; 99/302 P; 99/290
(58) Field of Classification Search ............. 99/275, 99/279, 287–303, 323; 221/209, 277, 87, 221/121, 150 A
   See application file for complete search history.

(56) References Cited

U.S. PATENT DOCUMENTS 6,216,754 B1 *   4/2001   Geroult et al. ............. 141/350
6,240,832 B1 *   6/2001   Schmed et al. ........... 99/289 R
6,345,570 B1 *   2/2002   Santi ......................... 99/289 R
6,799,503 B2 *  10/2004   Kollep et al. ................. 99/295
6,966,251 B2 * 11/2005   Yoakim ....................... 99/295

FOREIGN PATENT DOCUMENTS

| EP | 0 299 399 B1 | 1/1989 |
| FR | 2 440 720 | 6/1980 |
| FR | 2 780 261 A1 | 12/1999 |
| WO | WO 99/12457 | 3/1999 |
| WO | WO 99/12458 | 3/1999 |

* cited by examiner

*Primary Examiner*—Timothy F. Simone
(74) *Attorney, Agent, or Firm*—Browdy and Neimark, PLLC

(57) ABSTRACT

An automatic coffeemaker having, at the interior of a housing: an infusion group that includes an infusion chamber arranged to receive a pressing piston and means for actuating a relative sliding movement, between the pressing piston and the infusion chamber, between a rest position in which the piston is outside of the infusion chamber and a working position in which the piston is inside the infusion chamber; and a ground coffee distributor having a distribution orifice that communicates with a chute arranged to channel ground coffee toward the infusion chamber, wherein a drawer for collecting ground coffee grains is disposed under the chute and covers the periphery of the infusion chamber, the drawer being mounted in a manner to allow it to be directly withdrawn from the machine.

13 Claims, 4 Drawing Sheets

AUTOMATIC COFFEEMAKER

BACKGROUND OF THE INVENTION

The present invention relates to an automatic coffeemaker for preparing infused beverages using ground coffee coming from a distributor or from a coffee grinder.

An appliance for the preparation and distribution of hot beverages based on ground coffee generally includes a cold water reservoir, an electric pump, an assembly forming a boiler and an infusion head arranged to receive the coffee in ground form in order to inject hot water coming from the boiler into the grounds, the resulting beverage then being directed toward a collecting vessel. At the end of the infusion cycle, the infusion head must be opened in order to be able to introduce therein a new infusion product after having removed the used coffee grounds.

Such an appliance is described in the patent document WO 99/12457, the disclosure of which is incorporated herein by reference, and concerns an appliance adapted to prepare and automatically distribute espresso coffee. The appliance includes an infusion group having an infusion chamber with a vertical axis arranged to receive a pressing piston sliding along the vertical axis and driven by the piston of a hydraulic jack. The piston of the hydraulic jack is connected to the pressing piston and can pass from a rest position to a work position in which the pressing piston is under compression in the infusion chamber under the effect of the liquid that is under pressure. Passage to the rest position is effected by a return spring, and an ejecting arm is provided to remove the used pellet of coffee grounds exiting from the infusion chamber. The appliance also includes a distributor for ground coffee coming either from a ground coffee storage device, or from a coffee grinder, with the distribution orifice thereof opening into a chute that leads the grounds toward the infusion chamber.

Although machines of this type operate in a generally satisfactory manner, it has been observed that, during use, ground coffee grains become attached to the chute and fall alongside the inlet orifice into the infusion chamber and accumulate within the machine. Moreover, when the quantity of grounds in the infusion chamber is too small, so that the pellet is not sufficiently compacted, the ejection arm can break up the pellet, pieces of which spread into the surrounding area. As a result, clumps of coffee grounds form within the machine, more particularly around the infusion head, which can provoke, eventually, malfunctioning of the machine. This requires disassembly and cleaning of the interior of the machine at regular intervals, a procedure that proves rather difficult and complex in the case of most machines.

Several documents describe coffeemakers having a modular construction and allowing easier access to the interior of the machine in order to reduce the time required for repair. Thus, the patent documents FR 2440720 and EP 0299399, the disclosures of which are incorporated herein by reference, disclose coffeemakers having a housing composed of a removable module in the form of a drawer that is mounted to slide on rails and that supports the components of the machine. Such a solution permits a more rapid replacement of a defective module, but nevertheless requires the intervention of a qualified repair technician and removal of certain attachment parts of the module, even the drawer. In addition, those coffeemakers have components that are relatively fragile and that have complex interconnections.

Moreover, the French patent document no. 2 780 261, the disclosure of which is incorporated herein by reference, which describes a mixing device for an automatic distributor of hot beverages, discloses a solution that is adapted more particularly to volatile powdered products. The solution proposed in this document consists in arranging, above a mixing space, a lid provided with a distribution funnel and baffles that cooperate with those of an underlying drawer in order to trap and capture the volatile particles of the powder that rise up into the upper part of the mixing space together with injected water vapor. The drawer and its lid can be removed and cleaned when other maintenance is being performed on the machine. However, this device has a number of drawbacks, including the fact that it consists of a large number of parts having complex shapes. In addition, due to the absence of any warning of the occurrence of clogging, and the absence of a direct access to the subassembly to be cleaned, the maintenance technician must, when a decision is made to clean the machine, first remove a part of the housing of the automatic distributor in order to gain access to the part to be cleaned.

BRIEF SUMMARY OF THE INVENTION

The present invention provides novel automatic coffeemakers for making coffee of good quality, while being particularly easy to clean and maintain.

Automatic coffeemakers according to the invention are also constructed to warn the user that the machine must be cleaned, and the coffeemakers can be cleaned easily by the user, without requiring the services of a trained technician.

Coffeemakers according to the invention are structurally relatively simple and inexpensive, while exhibiting good operating reliability.

More specifically, an automatic coffeemaker according to the invention comprises, at the interior of a housing, or case, the following components:

- an infusion group that includes an infusion chamber arranged to receive a pressing piston and means for actuating a relative sliding movement between the pressing piston and the infusion chamber, between a rest position in which the piston is outside of the infusion chamber and a working position in which the piston is inside the infusion chamber; and
- a ground coffee distributor having a distribution orifice that communicates with a chute arranged to channel ground coffee toward the infusion chamber, wherein a drawer for collecting ground coffee grains is disposed under the chute and covers the periphery of the infusion chamber, the drawer being mounted in a manner to allow it to be directly withdrawn from the machine.

The ground coffee distributor can be of the type having a reservoir that contains coffee grounds and at the interior of which there is provided a hub carrying blades arranged to pass a certain quantity of grounds through a distribution orifice into a chute that leads to a point in the vicinity of the infusion chamber. Such a distributor can also be a coffee mill, or grinder, that delivers a certain quantity of ground coffee directly, through a distribution orifice, or by the intermediary of a buffer chamber, into a chute that transfers the ground coffee toward the infusion chamber. Such a chute is a conduit that has a generally vertical or inclined orientation relative to the infusion chamber, so that the grounds fall under the influence of gravity into the infusion chamber.

A "collection drawer" as employed herein is understood to mean a part that is arranged at the interior of the machine, more particularly in proximity to the opening of the infusion chamber that it surrounds or that it borders, having dimensions larger than those of the infusion chamber, in a manner to be able to collect the grounds that are possibly lost at the inlet to the infusion chamber.

The "periphery", preferably horizontal, of the infusion chamber, as used herein, is understood to be a planar zone surrounding the opening of the infusion chamber into which the piston passes, the zone having an extent sufficient to limit the losses of grounds around this chamber, which grounds would otherwise fall into the lower part of the housing or its components.

According to the invention, the drawer for collection of particles or grains of ground coffee is arranged under the chute, more precisely between the end of the chute that opens into the inlet of the infusion chamber and the infusion chamber itself. Thus, ground coffee grains arriving by the chute of the distributor that do not fall into the infusion chamber, but rather fall alongside the chamber, or that rest on the walls of the chute, or that arrive from the chute after closing of the infusion chamber, are collected by the collection drawer. Such a collection drawer is thus arranged above the infusion chamber and is provided with an opening for passage of the piston. Alternatively, the drawer can be positioned laterally, alongside the inlet into the infusion chamber.

A collection drawer mounted in a manner to be able to be directly withdrawn from the machine is further understood herein to be a drawer that can be removed by the user from outside the machine, without the need to open the housing of the machine and without having to utilize any tools for disassembling the housing or the drawer. Thus, the drawer can have a part that projects outside of the housing in order to be gripped by the user, or even an ejection mechanism can be provided to release and move the drawer outside of the housing when the user acts on a control button that may be placed on the front of, or outside of, the housing. Such a collection drawer can then be easily taken out by the user for cleaning.

This permits the cleaning to be easily performed by the user and guarantees an efficient operation and a long useful life for the machine.

Also according to the invention, the collection drawer covers the periphery of a passage opening into a tank for grounds.

The drawer for collection of ground coffee grains thus links the outlet of the infusion chamber to the inlet of a tank for grounds, provided to recover the used coffee pellets. Thus, when a pellet has not been sufficiently tamped and is disintegrated by the action of the ejector arm of the machine, the resulting fragments are then collected by the collection drawer, which communicates with the tank for receiving grounds in order to direct the particles of used coffee toward the tank.

Preferably, the collection drawer is mounted to slide in a slot of the housing and is guided in a translational movement by a support disposed in the housing.

It would also be possible to mount the collection drawer to pivot around an axis carried by the machine housing and actuated from outside the housing, or even a drawer immovably mounted at the interior of the machine and accessible through a trap that is opened from the outside. However, a drawer that is mounted to simply slide into the housing and that can thus can be easily withdrawn from the housing offers greater simplicity and efficiency and may therefore be preferable.

Also preferably, the collection drawer has a generally flat, rectangular form and includes a handle that projects out from the housing.

Such a drawer permits grains of ground coffee to be collected over a large surface, with a drawer that occupies a small volume, while permitting the drawer to be easily withdrawn from the housing by direct action by the user on the handle.

Advantageously according to the invention, the collection drawer has a first orifice with a diameter close to the internal diameter of the infusion chamber, placing the drawer in communication with the latter.

Such a drawer is a planar part disposed above the inlet of the infusion chamber and the first orifice is traversed by the pressing piston that slides relative to the chamber. Such an orifice then has a diameter slightly greater than that of the infusion chamber, permitting the piston to traverse the drawer, but not allowing coffee grounds, before or after use, to pass between the orifice of the drawer and the walls of the infusion chamber.

Preferably according to the invention, the collection drawer includes a second orifice placing it in communication with the grounds collection tank.

The second orifice permits an ejector arm that sweeps the coffee grounds pellet to push the grounds into the tank, while retaining in the drawer possible fragments of the pellet that are not completely evacuated into the tank. The first and second orifices are formed on the basis of the specific configuration of the coffeemaker, for example, so as to occupy a minimum space. One orifice can be arranged as a prolongation of the other.

Advantageously, the automatic coffeemaker according to the invention includes an indicator of the proper insertion and seating of the collection drawer within the machine. This allows the drawer to be completely removable, while allowing the user to be certain that the drawer has been fully reinstalled, in order to ensure proper and reliable operation of the machine, above all for a drawer that is provided to be traversed by the pressing piston that will be introduced into the infusion chamber.

Preferably, the indicator is a switch connected to an electronic control circuit of the machine.

It would be possible to use a simple visual indicator that allows the user to be assured that the drawer has been properly installed. However, it is presently preferred to use an electric switch that is connected to the control circuit of the machine, thereby preventing operation of the machine when the drawer has not been installed or has been installed in an incorrect position.

According to another particularly advantageous aspect of the invention, the coffeemaker includes means for alerting the user to clean the collection drawer, connected to the indicator or the switch.

These means can include a counter of the number of cycles of operation of the machine, or an internal clock, that will alert the user, after a certain number of operating cycles or after a predetermined time of operation, that the collection drawer should be withdrawn and cleaned.

Preferably, the support for the collection drawer is fixed to the infusion chamber and carries the switch.

Such a support is fixed to the infusion chamber and assures, at the same time, the presence of the drawer in proximity to the chamber and reliable guidance and final positioning of the drawer at the interior of the machine.

Advantageously, the indicator switch is actuated by the collection drawer when it arrives at an abutment position in the support within the machine.

The collection drawer, arriving at an abutment position in the guiding support at the interior of the machine, triggers the indicator switch supported by the latter. Such an arrangement creates certainty as to the correct positioning of the drawer and, at the same time, provokes a triggering of a counter of the number of cycles of operation of the machine, which determines the ultimate need to clean the collection drawer.

BRIEF DESCRIPTION OF THE DRAWINGS

The invention will be better understood from a study of embodiments presented by way of non-limiting example and illustrated in the attached figures.

DETAILED DESCRIPTION OF THE INVENTION

Figure 1:
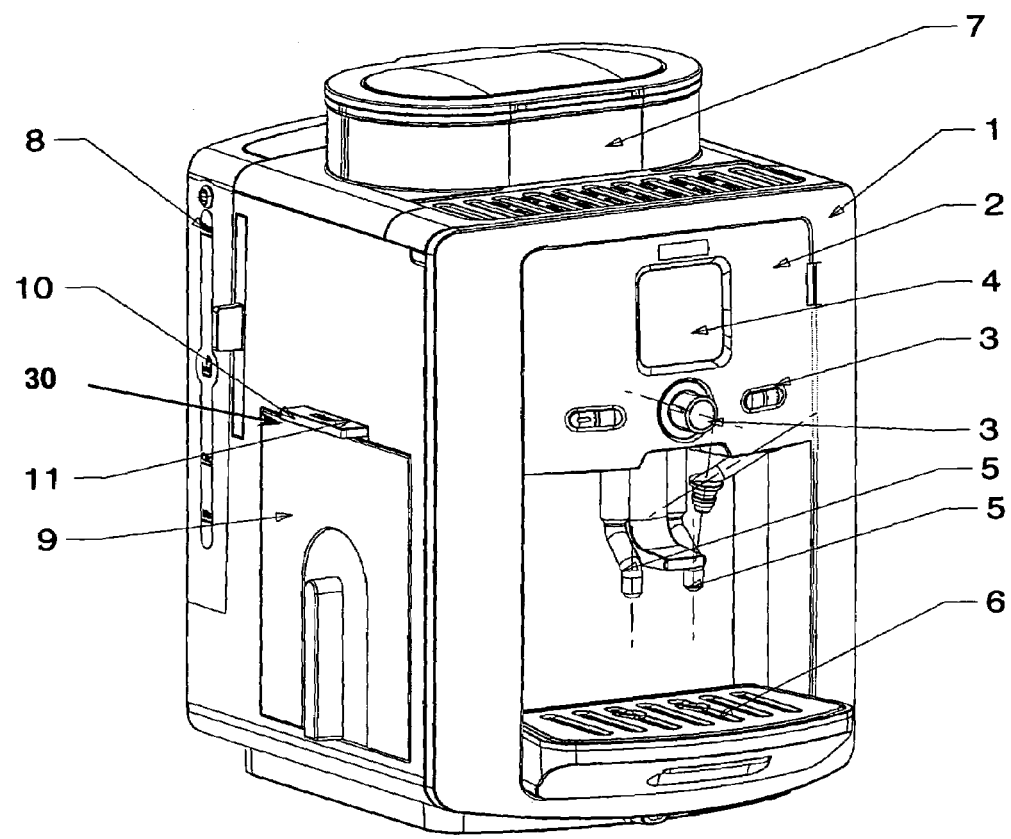
FIG. 1 is a perspective view of one embodiment of an automatic coffeemaker according to the invention.

The illustrated embodiment of an automatic coffeemaker according to the invention is adapted to produce espresso coffee and, as shown in FIG. 1, includes a housing 1 having the general form of a parallelepiped, or cube, that houses the main operating elements of the machine. Housing 1 has a facade provided with a control panel 2 constituted by a series of buttons 3 acting on the electronic control circuit of the machine and a display 4. A beverage prepared by the machine flows through outlet tubes 5 into a cup (not shown) placed on a support 6. A reservoir 7 for ground coffee is disposed at the upper part of housing 1 and a water reservoir 8 is located at the rear of housing 1. On one of the lateral sides of the housing there is provided a coffee grounds tank 9 adapted to receive used coffee pellets coming from the infusion chamber of the machine.

Figure 2:
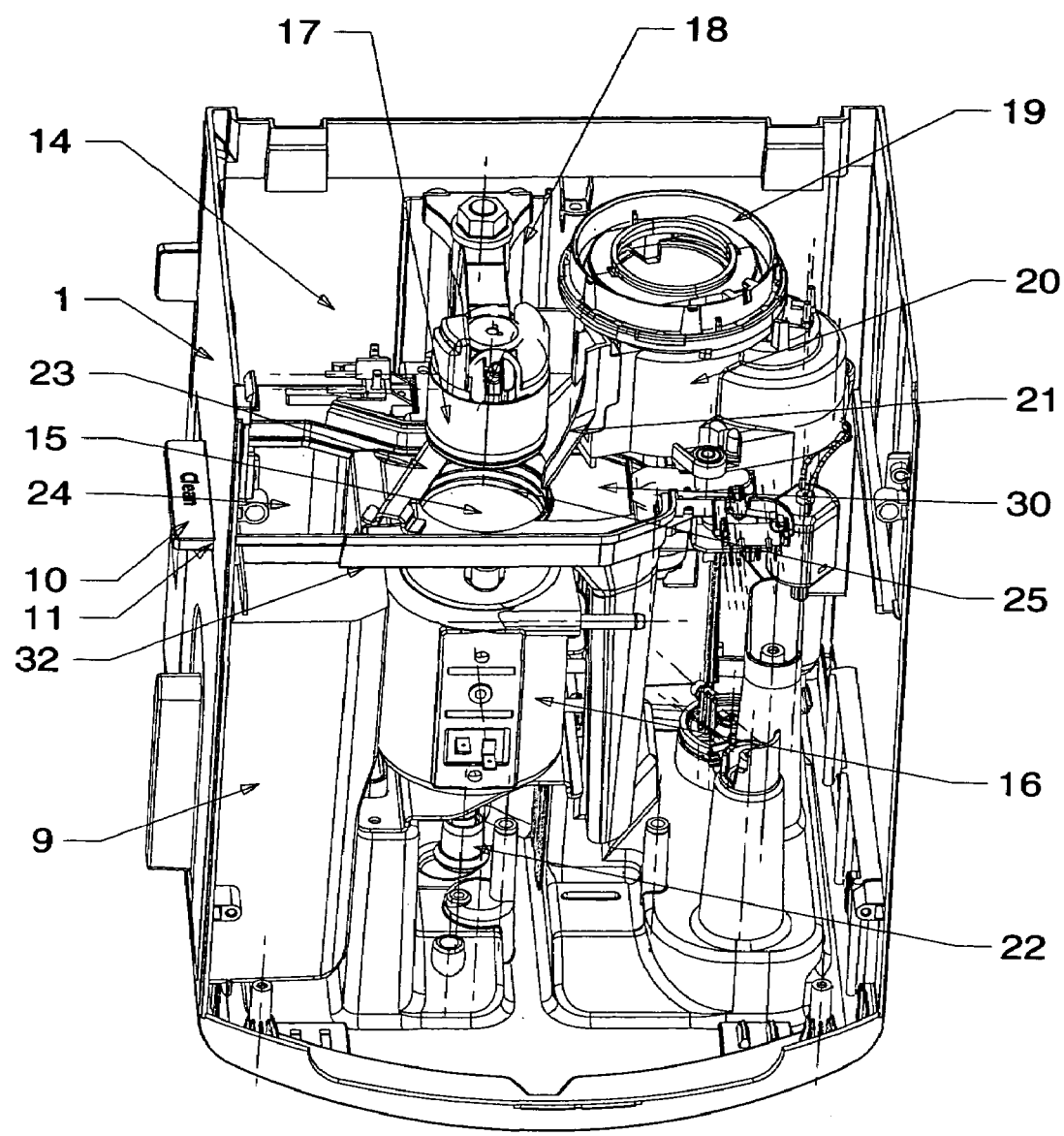
FIG. 2 is a perspective view of embodiment of FIG. 1, with certain walls of the external housing and certain components removed to facilitate viewing of other components.

FIG. 2 shows the same machine as FIG. 1, but walls of the housing have been removed in part, as have certain internal components, in order to more easily observe and understand the main functional elements of the machine. Thus, FIG. 2 shows an infusion group 14 having an infusion chamber 15 in the form of a cylindrical tank adapted to receive a certain quantity of ground coffee above a lower wall forming a filter for the coffee grounds. Infusion chamber 15 is mounted in a fixed position above a heating block 16. Block 16 has a vertical axis and chamber 15 forms an extension, or prolongation, of block 16. Thermal block 16 encloses a water circuit and an electric heating element, which components are conventional and are not illustrated in detail. An example of such a heating block structure is disclosed, for example, in the published document WO 99/12456, the disclosure of which is incorporated herein by reference. Thermal block 16 assures a supply of hot water for infusion chamber 15.

Infusion chamber 15 receives a pressing piston 17 that slides vertically in infusion chamber 15 while forming a seal with the wall of chamber 15 in order to compact, or tamp down, coffee grounds to form a pellet. The appliance also includes means 18 for actuating pressing piston 17. Means 18 are constituted, in the example shown, by a hydraulic jack having an internal piston connected to piston 17 by an intermediate rigid rod, or bar. The hydraulic jack receives a liquid under pressure coming from a hydraulic circuit of the appliance, which liquid displaces the piston of the jack toward the bottom at the same time as pressing piston 17, which then passes from a rest position, at the upper part of the appliance, to a working position while descending vertically in the direction of infusion chamber 15 in order to compress the grounds. Hot water is then delivered through the grounds, producing an infused beverage that is then evacuated through pressing piston 17, via a channel of the latter extended by a conduit and outlet tubes 5, which direct the beverage toward the outside where it is collected in a cup. The hydraulic jack described herein is a single acting jack, return of the jack piston to the rest position being effected by a spring situated in the lower part of the jack. Such a jack is described in greater detail in the patent document WO 99/12457, cited earlier herein.

The appliance also has a distributor of grounds 19, which comprises, in the example represented in FIGS. 1 and 2, a reservoir 7 for holding coffee beans and a grinder, or mill, 20 for grinding the beans. The coffee beans drop into the interior of grinder, or mill, 20, the latter comprising generally a shaft driven in rotation by an electric motor to rotate a grinding element against a stationary grinding element, the coffee beans being introduced between these elements to exit in the form of grounds to a distribution orifice through which the grounds pass into a chute 21 has a form somewhat similar to a playground slide that is inclined to the vertical and is widened in its lower part, the lower part being situated above infusion chamber 15. The upper part of chute 21 communicates with the outlet of grinder 20.

At the end of the infusion preparation cycle, the pellet of grounds present in the infusion chamber is pushed toward the upper part of the chamber by the shaft of an ejector 22 that passes through heating unit 16. A scraping arm 23 is then operated by a mechanism by the machine in order to sweep the pellet above infusion chamber 15 and push it toward a passage 24 opening into a grounds collection tank 9 which stores the used pellet.

A collection drawer 30 is arranged between infusion chamber 15, particularly immediately thereabove, adjacent inlet orifice 25 of chamber 15, and the lower end of chute 21. Drawer 30 is mounted to slide at the interior of housing 1 of the coffeemaker, preferably within a support subassembly 32, the latter being mounted to be fixed in position on infusion chamber 15 and to be fixed in position with respect to housing 1.

Figure 3:
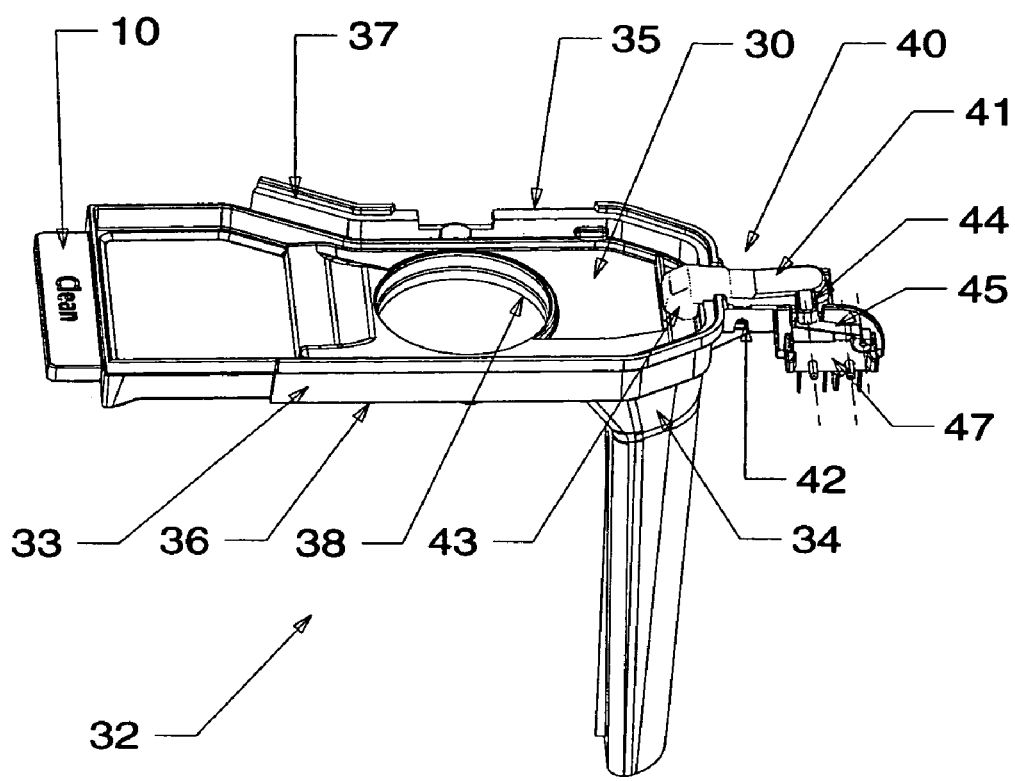
FIG. 3 is a perspective view of a subassembly for supporting the collection drawer according to one embodiment of the invention.

Support subassembly 32 is shown more clearly in FIG. 3. It includes a frame 33 lying in a horizontal plane that is prolonged along one side by a vertical funnel 34 for coffee grounds overflows communicating with an underlying recovery tank. The edge of frame 33 has walls that serve to orient and guide collection drawer 30. Specifically, two parallel longitudinal walls 35, 36 of frame 33 assure a guidance in translation of drawer 30 during its movement relative to one side of frame 33. On another side of frame 33, in an extension of longitudinal wall 35, there is provided a widened wall 37 that constitutes a guidance, or centering, element assuring insertion of drawer 30 in its proper position. Frame 33 has a through opening 38 having a diameter slightly greater than the interior diameter of infusion chamber 15. Frame 33 is fixed to infusion chamber 33, for example by fixation screws situated to one side and the other of through opening 38.

Frame 33 supports, at its end that is opposite to the end through which the drawer is introduced, a device 40 for detecting the presence of drawer 30. Device 40 includes a pivot member, or bascule, 41 mounted to pivot about an axis 42 forming part of frame 33. Member 41 has a front end 43 that is urged downwardly by the action of a compression spring located at the rear of member 41, the spring being interposed between the rear of member 41 and an element forming part of the body of frame 33. When drawer 30 is inserted and arrives at its abutment position within frame 33, drawer 30 pushes front end 43 of member 41 upwardly, causing it to pivot in a manner such that the rear end 44 of member 41 comes to bear, via a lever 45, against a contact of a switch 47. Switch 47 is electrically connected to the electronic control circuit of the machine and closing of the switch produces a signal indicating that drawer 30 has been correctly introduced into the machine.

Figure 4:
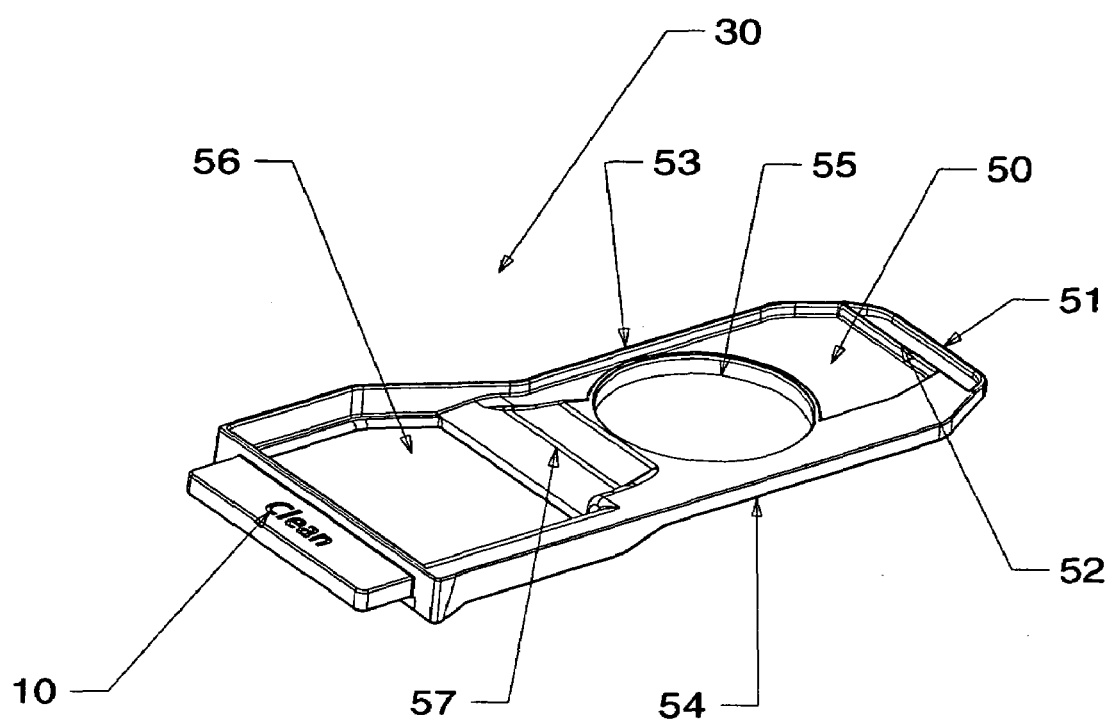
FIG. 4 is a perspective view of a collection drawer according to one embodiment of the invention.

An embodiment of drawer 30 is shown in greater detail in FIG. 4. According to this embodiment, drawer 30 has a generally flat, rectangular form and includes two edges situated at the same level as one another, as well as a depressed bottom wall 50 that forms a receptacle for coffee grounds. Drawer 30 has, at one of its ends, a handle 10 and, at its opposite end, a tip 51 intended to cooperate with the front end 43 of member 41. Front end 43 comes into abutment against a rib 52 formed on bottom wall 50 of drawer 30 when the latter has been fully inserted into frame 33. During insertion of drawer 30, longitudinal walls 53, 54 of drawer 30 are guided by sliding along longitudinal walls 35, 36 of frame 33. Drawer 30 also includes a first opening, or orifice, 55 having horizontal dimensions slightly greater than those of through opening 38 of frame 33, and thus slightly greater than the internal diameter of infusion chamber 15. A second opening, or orifice, 56 is spaced from orifice 55 in the direction of handle 10 and permits drawer 30 to communicate with underlying tank 9. A ramp, or incline, 57 is situated between orifices 55 and 56 to permit a pellet of coffee grounds swept by ejector arm 23 to slide easily toward tank 9.

When the coffeemaker is placed into operation, ground coffee distributor 19 delivers, through chute 21, a predetermined quantity of ground coffee, corresponding to a predetermined operating time of grinder 20, in order to obtain the desired quantity of beverage in infusion chamber 15. Pressing piston 17 descends into infusion chamber 15 and compresses the grounds. Hot water under pressure then arrives in chamber 15 after traversing heating block 16 and the resulting beverage passes through, or across, the body of pressing piston 17 and flows through outlet tubes 5 into a cup that is outside of the machine, such is described in greater detail in the patent document WO 99/12456, cited earlier herein. At the end of the infusion cycle, pressing piston 17 returns to its raised position, ejector 22 lifts the pellet of coffee grounds, from infusion chamber 15 to the level of drawer 30, through first orifice 55 of drawer 30, and from that position scraping arm 23 pushes the pellet of grounds into tank 9 through second orifice 56 of drawer 30. A new cycle of beverage preparation can then begin.

After a certain number of cycles of operation, which are counted by a counter integrated into the software of the control unit for the electronic circuit of the machine, or after a certain operating time, display 4, or, according to one alternative, a specific indicator light of control panel 2, informs the user that drawer 30 must be cleaned. To perform such cleaning, the user grips handle 10 of drawer 30 and withdraws drawer 30 by a translational movement out of the machine. From this moment, the system for counting the number of cycles, or the timer, is reinitialized and the indication to clean the drawer is deleted, or the signal light is turned off. The user shakes the drawer to free adhering grounds and then cleans the drawer under running water. Once the drawer has been cleaned, it is reinserted into the machine by sliding the drawer through slot 11 of housing 1 into frame 33. When drawer 30 has been properly positioned within frame 33, detector 40 generates a signal informing the electronic circuit, and the user can then place the machine back into operation and initiate a new beverage producing cycle.

For safety reasons, the electronic control circuit of the appliance does not allow the machine to operate unless the drawer is properly installed and positioned in the housing.

In the same manner, if the user does not remove the drawer when the machine indicates that this should be done, the machine cannot function. Such a solution presents the advantages of being simple and inexpensive to manufacture, while alerting the user when the drawer must be cleaned, thereby increasing the useful life of the coffeemaker.

According to a more complex embodiment of the invention, the collection drawer could be made in one piece with the grounds collection tank, which would then benefit from the same frequency of cleaning as the drawer itself.

This application relates to subject matter disclosed in French Application number FR 05 03124, filed on Mar. 31, 2005, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic coffeemaker comprising, in a housing having an interior:
   an infusion group that includes an infusion chamber having a periphery and arranged to receive a pressing piston and means for actuating a relative sliding movement, between the pressing piston and the infusion chamber, between a rest position in which the piston is outside of the infusion chamber and a working position in which the piston is inside the infusion chamber;
   a ground coffee distributor having a distribution orifice that communicates with a chute arranged to channel ground coffee toward the infusion chamber; and
   a collection drawer for collecting ground coffee disposed under the chute and covering the periphery of the infusion chamber, the drawer being mounted in a manner to allow it to be directly and completely removed from the coffeemaker.

2. The automatic coffeemaker according to claim 1, wherein the collection drawer covers a periphery of a passage opening into a tank for receiving used grounds.

3. The automatic coffeemaker according to claim 2, wherein the collection drawer is mounted to slide in a slot of the housing and is guided in a translational movement by a support disposed in the housing.

4. The automatic coffeemaker according to claim 1, wherein the collection drawer has a generally flat, rectangular form and includes a handle that projects out from the housing.

5. The automatic coffeemaker according to claim 1, wherein the infusion chamber has an internal diameter and the collection drawer has a first orifice with a diameter close to the internal diameter of the infusion chamber, for placing the drawer in communication with the infusion chamber.

6. The automatic coffeemaker according to claim 5, wherein the collection drawer covers a periphery of a passage opening into a tank for receiving used grounds, and the collection drawer has a second orifice for placing the drawer in communication with the tank for receiving used grounds.

7. The automatic coffeemaker according to claim 1, further comprising an indicator for indicating proper insertion and seating of the collection drawer within the housing of the coffeemaker.

8. The automatic coffeemaker according to claim 7, wherein the coffeemaker includes an electronic control circuit and the indicator is a switch connected to the electronic control circuit.

9. The automatic coffeemaker according to claim 8, further comprising means connected to the switch for indicating a need to clean the collection drawer.

10. The automatic coffeemaker according to claim 8, further comprising a support disposed in the housing, and wherein the collection drawer is mounted to slide in a slot of the housing and is guided in a translational movement by the support, and the support is fixed in position relative to the infusion chamber and carries the switch.

11. The automatic coffeemaker according to claim 10, wherein the switch is mounted to be actuated by the collection drawer when the collection drawer arrives at a predetermined abutment position in the support.

12. The automatic coffeemaker according to claim 7, further comprising means coupled to the indicator for indicating a need to clean the collection drawer.

13. The automatic coffeemaker according to claim 1, wherein the collection drawer is mounted to slide in a slot of the housing and is guided in a translational movement by a support disposed in the housing.

* * * * *